United States Patent
Kano

(10) Patent No.: US 8,588,521 B2
(45) Date of Patent: Nov. 19, 2013

(54) IMAGE PROCESSING APPARATUS AND CONTROL METHOD THEREFOR

(75) Inventor: Akira Kano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 313 days.

(21) Appl. No.: 12/911,226

(22) Filed: Oct. 25, 2010

(65) Prior Publication Data

US 2011/0103686 A1     May 5, 2011

(30) Foreign Application Priority Data

Nov. 4, 2009 (JP) ................................ 2009-253523

(51) Int. Cl.
*G06K 9/00* (2006.01)

(52) U.S. Cl.
USPC ....................................................... 382/167

(58) Field of Classification Search
None
See application file for complete search history.

(56) References Cited

U.S. PATENT DOCUMENTS

| 7,667,738 | B2 | 2/2010 | Utsugi | |
|---|---|---|---|---|
| 8,170,345 | B2 * | 5/2012 | Morita | 382/195 |
| 2007/0116375 | A1 | 5/2007 | Utsugi et al. | |
| 2008/0062409 | A1 * | 3/2008 | Utsugi | 356/124 |

FOREIGN PATENT DOCUMENTS

| JP | 2000-299874 | 10/2000 |
|---|---|---|
| JP | 2006-020275 | 1/2006 |

\* cited by examiner

*Primary Examiner* — Stephen R Koziol
*Assistant Examiner* — Amandeep Saini
(74) *Attorney, Agent, or Firm* — Cowan, Liebowitz & Latman, P.C.

(57) ABSTRACT

This invention discloses an image processing apparatus that can obtain, from an image, the amount of correction for chromatic aberration of magnification, that can appropriately correct a color shift while suppressing a change in color on the edge portion of the image before and after the correction. In obtaining the amount of color shift between one color plane and another color plane, the color differences before and after the color shift is corrected are calculated for each pair of pixels included in regions of interest. It is determined whether the amount of change in color difference before and after correction falls within a predetermined range. The amount of color shift is obtained in the range in which it is determined that the amount of change in color difference before and after correction falls within a predetermined range.

15 Claims, 11 Drawing Sheets

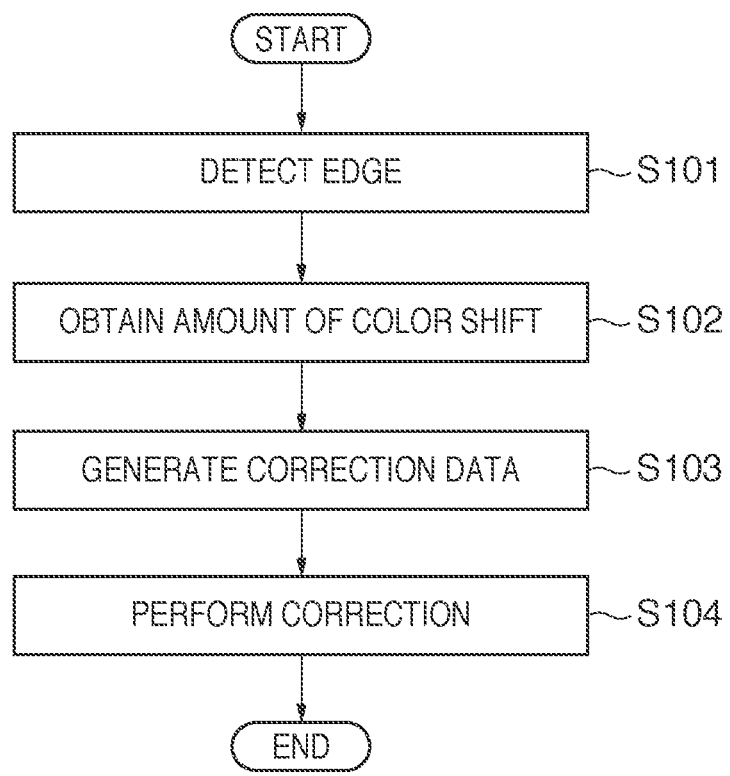

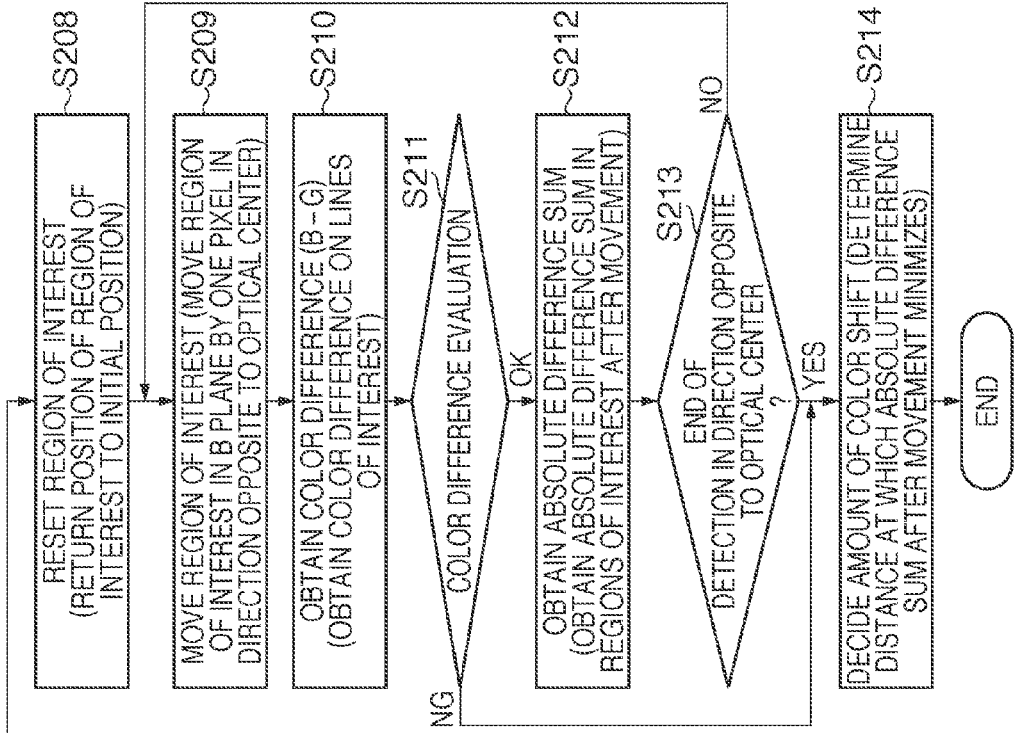
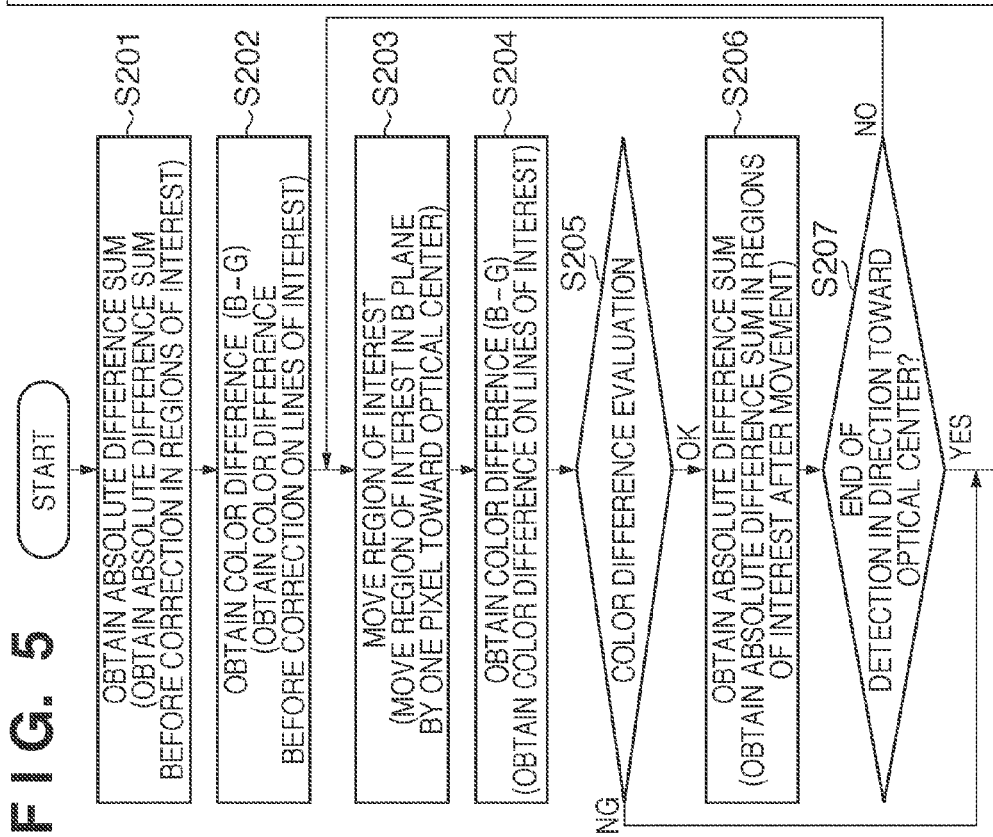
FIG. 5

IMAGE PROCESSING APPARATUS AND CONTROL METHOD THEREFOR

BACKGROUND OF THE INVENTION

1. Field of the Invention

The present invention relates to an image processing apparatus and a control method therefor and, more particularly, to an image processing apparatus that performs chromatic aberration correction, and a control method therefor.

2. Description of the Related Art

Image capturing apparatus such as digital cameras are employed in a variety of applications. However, various aberrations of a lens used to form an object image degrade the image quality of the object image. Chromatic aberration of magnification, for example, generates a color shift in the formed object image.

The number of pixels on an image sensor used for an image capturing apparatus is increasing each year, so the pixel size is reducing. Along with this trend, even chromatic aberration of magnification, that is too small to pose a serious problem in the conventional image capturing apparatus, has become a cause of degradation in image quality.

To correct color shift from image processing, a technique to obtain the amount of color shift to be corrected (that is, the amount of correction) from an image to be corrected has been proposed. The technique of obtaining the amount of color shift from an image adopts methods that use correlation between individual color components on the edge portion of the image.

Japanese Patent Laid-Open No. 2000-299874, for example, proposes a method of obtaining the amount of color shift by detecting a position where the sum total of the differences between the distances of pixels for respective color components corresponding to the edge minimizes. Also, Japanese Patent Laid-Open No. 2006-020275 proposes a method of detecting an edge from raw data and obtaining, as the color shift range, a displacement range within which an error between arrays of two types of color components on the edge portion minimizes.

In the color shift amount obtaining methods which use correlation between individual color components, as described in Japanese Patent Laid-Open Nos. 2000-299874 and 2006-020275, it is often the case that a precise amount of color shift cannot be obtained on an edge which suffers a blur, as shown in FIG. 1A. As a result, the hue on the edge portion considerably changes before and after correction, so a satisfactory correction effect cannot be obtained.

For example, assume that a G (Green) component and an R (Red) component have no color shift between them, but the G component (or the R component) and a B (Blue) color component have a color shift between them, as shown in FIG. 1A. In this case, a portion in the image corresponding to a hatched portion in FIG. 1A is yellow. When this color shift is corrected using the amount of color shift obtained by a method as described in Japanese Patent Laid-Open No. 2000-299874 or 2006-020275, the pixel values after correction are as shown in, for example, FIG. 1B, so the portion in the image corresponding to the hatched portion changes to blue upon overcorrection. The edge portion shown in FIGS. 1A and 1B is yellow before correction and changes to blue after correction, and this makes the observer feel unnatural when he or she compares the edge portion before correction with that after correction. This is because an overcorrected portion has been generated as a result of correcting the B component such that an error between arrays of the B component and G component (or R component) minimizes. One method reduces this feeling of unnaturalness by adjusting the hue on the corrected edge portion, but it may then change the original color tone of the object.

SUMMARY OF THE INVENTION

The present invention has been made in consideration of the above-mentioned problem in the prior art. The present invention provides an image processing apparatus which can obtain, from an image, the amount of correction for chromatic aberration of magnification, that can appropriately correct a color shift while suppressing a change in color on the edge portion of the image before and after the correction, and a control method therefor.

According to an aspect of the present invention, there is provided an image processing apparatus that corrects a color shift in a captured image including a plurality of color planes, comprising: obtaining unit configured to obtain an amount of color shift of a second color plane with respect to a first color plane on an edge portion of an image included in the captured image; and correction unit configured to correct a pixel value of the second color plane using correction data generated from the amount of color shift, wherein the obtaining unit includes color difference calculation unit configured to calculate a color difference between the first color plane and the second color plane for a plurality of pairs of pixels in regions of interest including the edge portion, at each of a plurality of positions to which the region of interest of the second color plane is moved relative to the first color plane, and obtains, as the amount of color shift of the second color plane with respect to the first color plane, a distance of the second color plane, at which a magnitude of change between (i) a color difference calculated by the color difference calculation unit without moving the region of interest of the second color plane and (ii) a color difference calculated by the color difference calculation unit upon moving the region of interest of the second color plane falls within a predetermined range, and a sum of absolute values of color differences between pixels in the regions of interest minimizes.

According to another aspect of the present invention, there is provided a control method for an image processing apparatus which corrects a color shift in a captured image including a plurality of color planes, comprising: an obtaining step of obtaining an amount of color shift of a second color plane with respect to a first color plane on an edge portion of an image included in the captured image; and a correction step of correcting a pixel value of the second color plane using correction data generated from the amount of color shift, wherein the obtaining step includes a color difference calculation step of calculating a color difference between the first color plane and the second color plane for a plurality of pairs of pixels in regions of interest including the edge portion, at each of a plurality of positions to which the region of interest of the second color plane is moved relative to the first color plane, and in the obtaining step, a distance of the second color plane, at which a magnitude of change between a color difference calculated in the color difference calculation step without moving the region of interest of the second color plane and a color difference calculated in the color difference calculation step upon moving the region of interest of the second color plane falls within a predetermined range, and a sum of absolute values of color differences between pixels in the regions of interest minimizes, is obtained as the amount of color shift of the second color plane with respect to the first color plane.

Further features of the present invention will become apparent from the following description of exemplary embodiments with reference to the attached drawings.

BRIEF DESCRIPTION OF THE DRAWINGS

FIG. 3 is a flowchart showing a color shift correction process of the image capturing apparatus according to the embodiment of the present invention;

FIG. 5 is a flowchart for explaining details of a color shift amount obtaining process in step S102 of FIG. 3;

DESCRIPTION OF THE EMBODIMENTS

Exemplary embodiments of the present invention will now be described in detail in accordance with the accompanying drawings.

Although the embodiments to be described hereinafter are based on a specific arrangement for the sake of easy explanation and understanding, the present invention is not limited to such a specific arrangement.

Also, although a method of obtaining the amount of color shift between two color components (color planes), for example, between a G plane and an R plane will be explained in the following embodiments, the amount of color shift between another pair of color planes, that is, between the G plane and a B plane can be similarly obtained.

First Embodiment

Figure 1B:
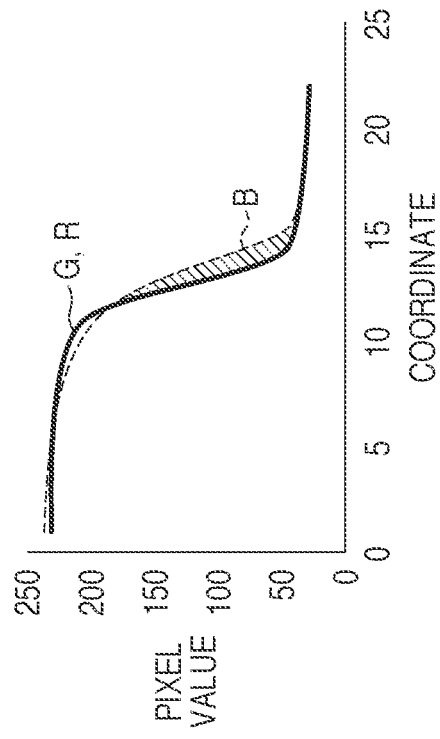
FIGS. 1A and 1B are graphs for explaining a color shift on an edge portion.
Figure 1A:
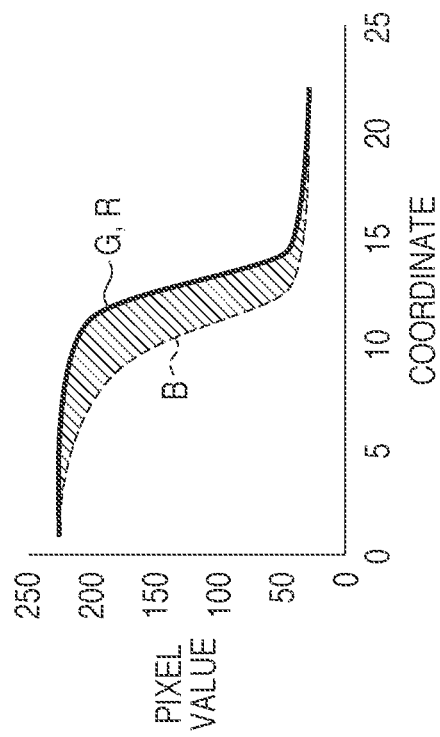
Figure 2:
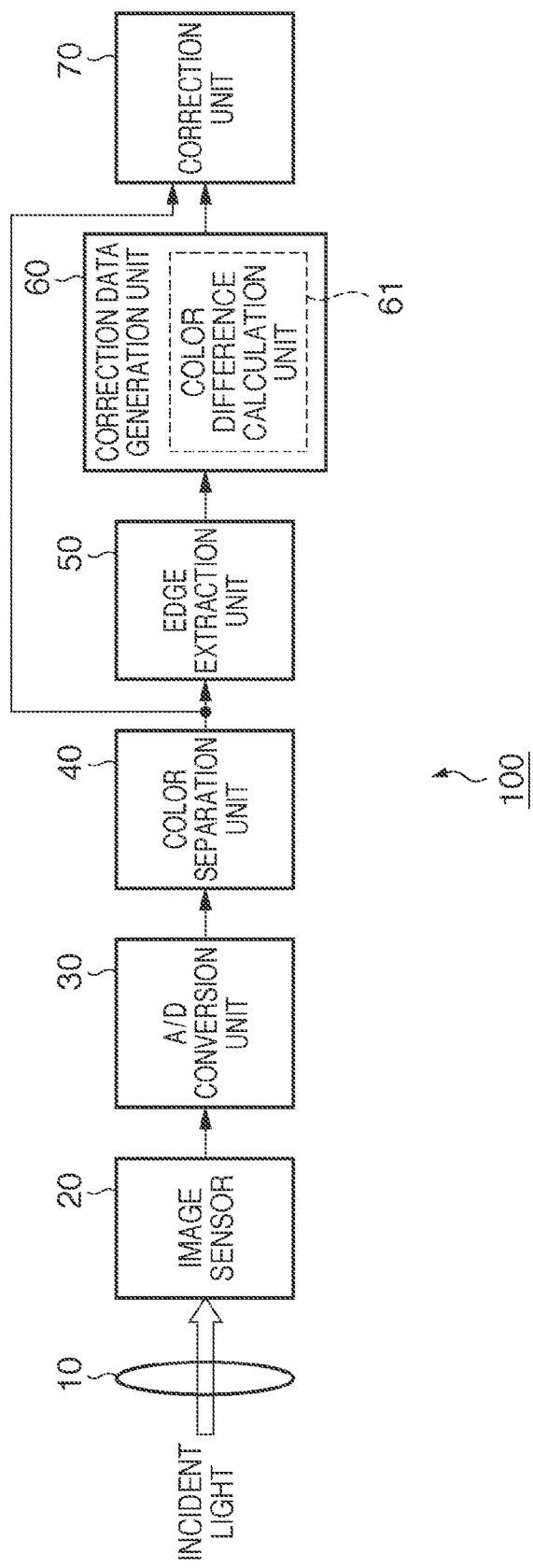
FIG. 2 is a functional block diagram of an image capturing apparatus as an example of an image processing apparatus according to an embodiment of the present invention.

FIG. 2 is a functional block diagram of an image capturing apparatus 100 according to the embodiment.

The image capturing apparatus 100 includes an imaging optical system 10, an image sensor 20, an A/D conversion unit 30, a color separation unit 40, an edge extraction unit 50, a correction data generation unit 60 including a color difference calculation unit 61, and a correction unit 70.

The imaging optical system 10 forms an object image on the image sensor 20. In this embodiment, the image sensor 20 is a single-plate color image sensor in which photoelectric conversion elements are two-dimensionally arrayed and which includes a general primary color filter. The primary color filter has an arrangement in which three types of unit filters (R filters, G filters, and B filters) with dominant transmitted wavelength ranges in the vicinities of 650 nm, 550 nm, and 450 nm, respectively, are two-dimensionally arrayed such that unit filters of each type correspond to one photoelectric conversion element. Thus, each photoelectric conversion element receives light transmitted through unit filters of one type, and outputs an electrical signal indicating the intensity of the received light. Hence, each photoelectric conversion element of the single-plate color image sensor can only output the intensity of one of R, G, and B planes. This means that the captured image output from the image sensor 20 is a color mosaic image.

The A/D conversion unit 30 converts the color mosaic image output from the image sensor 20 as an analog voltage into digital data suitable for subsequent image processing.

The color separation unit 40 interpolates the color mosaic image to generate color images having full RGB color information in all pixels.

Note that in this embodiment, the interpolation method may be of any of various proposed schemes, such as interpolation based on the value of a pixel which is in the vicinity of the target pixel and forms the same color plane as the latter, and interpolation based on the value of a pixel which is adjacent to the target pixel and forms a different color plane from the latter.

The edge extraction unit 50 detects an edge from the generated color image. Based on information on the edge detected by the edge extraction unit 50, the correction data generation unit 60 obtains the amount of correction for chromatic aberration of magnification from the color image, and generates correction data for chromatic aberration of magnification. The correction unit 70 corrects the chromatic aberration of magnification of the color image using the correction data generated by the correction data generation unit 60.

(Process of Correcting Chromatic Aberration of Magnification: Overall Procedure)

FIG. 3 is a flowchart showing the sequence of a process of correcting chromatic aberration of magnification by the edge extraction unit 50, correction data generation unit 60, and correction unit 70.

First, in step S101, the edge extraction unit 50 detects an edge from a color image generated by the color separation unit 40. This is because a color shift due to the chromatic aberration of magnification of the imaging optical system 10 conspicuously appears on the edge portion of the image. A Y (luminance) plane is used in detecting an edge from the image. The Y plane can be calculated using a known equation from R, G, and B planes. Alternatively, the value of a G plane may be used as a Y plane.

Note that an accurate amount of color shift can be obtained by limiting the edge to be detected in step S101 to an edge on which the pixel value considerably changes in the radial direction from the optical center. Note also that since a color shift due to chromatic aberration of magnification appears as a blur in the Y plane, an edge with a certain width, in which a predetermined number of successive pixels monotonically and successively increase or decrease in their values in the width direction, is detected.

In step S102, the correction data generation unit 60 obtains the amount of color shift on each edge detected in step S101. Details of an operation of obtaining the amount of color shift will be described later. The process in step S102 can be simplified upon determining, based on the positional relationship between the optical center and each edge, the direction of color shift to be obtained in step S102 as one of the upward/downward direction, the leftward/rightward direction, the oblique upper right/oblique lower left direction, and the oblique upper left/oblique lower right direction.

The amount of color shift obtained in step S102 is assumed to have a negative value if the R plane (or the B plane) shifts toward the optical center with respect to the G plane, and have a positive value if the R plane (or the B plane) shifts in a direction opposite to the optical center.

In step S103, the correction data generation unit 60 generates correction data by obtaining the relationship between the image height and a color shift from the image height of each edge detected in step S101, and the amount of color shift on each edge obtained in step S102. The image height means herein the distance from a pixel (to be referred to as the image center or the optical center hereinafter) corresponding to the optical center.

The procedure of generating correction data in step S103 by the correction data generation unit 60 will be described in detail.

(1) The color shift rate M to the image height is obtained as M=D/L where L is the image height of the edge detected in step S101, and D is the amount of color shift obtained in step S102.

Figure 4A:
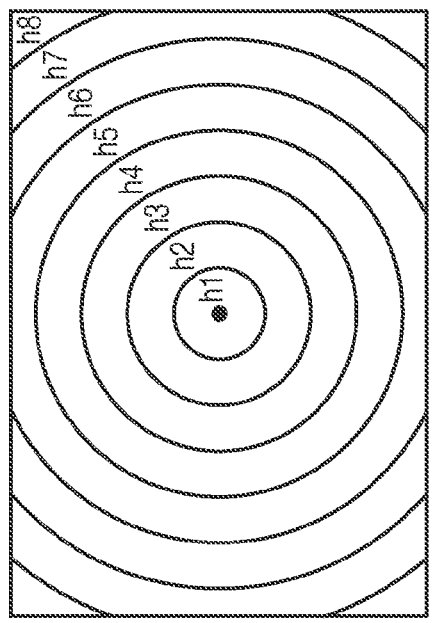
FIG. 4A is a view showing an example of regions divided for each image height.

(2) The image is divided into eight regions h1 to h8 for each image height, as shown in FIG. 4A, and regions to which the individual edges belong are selected.

(3) The processes in (1) and (2) are performed for the individual edges detected in the image, and the average of the color shift rates M is obtained for each region and determined as the color shift rate in each region.

Figure 4B:
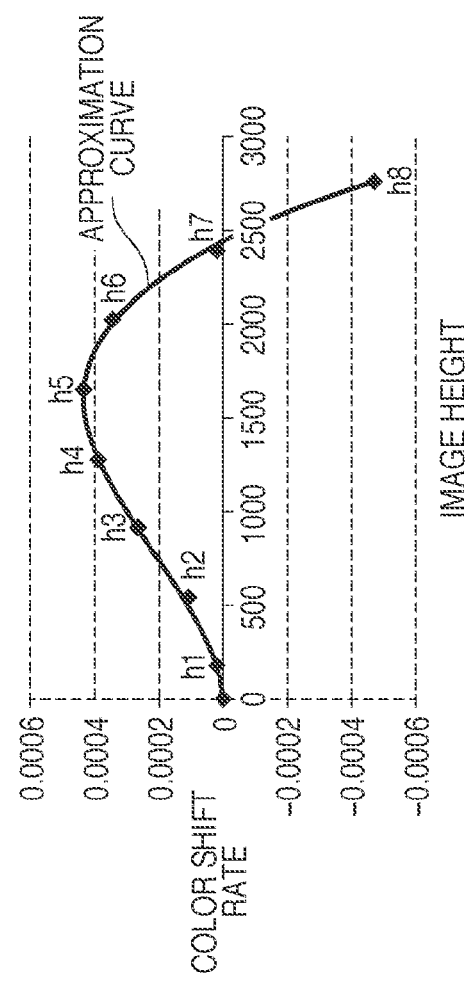
FIG. 4B is a graph showing an example of correction data.

(4) A high-order polynomial approximation F(l) describing the relationship between the image height and the color shift rate is calculated from the image height and the color shift rate in each region, and determined as correction data, as shown in FIG. 4B. FIG. 4B shows an example in which correction data is calculated using a third-order polynomial.

The edge detection and the color shift amount obtaining may be performed for all edges contained in the color image. However, the process efficiency can be improved, while sustaining a given reliability of the color shift rate, by ending both the detection of an edge belonging to each of the eight regions divided for each image height, and the color shift amount obtaining when color shift rates the number of which is equal to or larger than a certain threshold have been accumulated in the region.

Also, using only regions where edges to be detected have been found among the eight regions divided for each image height to calculate a high-order polynomial approximation, correction data can be generated even for regions where edges to be detected have not been found.

In step S104, the correction unit 70 uses the correction data generated in step S103 to apply color shift correction to the color image.

First, the correction unit 70 obtains the color shift rate M using the correction data and the polynomial approximation F(l) in a pixel (X,Y) in planes (R and B planes) to be corrected, from the image height L of the pixel (X,Y). Note that the pixel coordinates are represented by a coordinate system which uses the optical center as its origin (0,0).

Next, the correction unit 70 obtains pixel coordinates (X1, Y1) generated by color shift correction as:

$$X1 = M \times X$$

$$Y1 = M \times Y$$

Lastly, the correction unit 70 generates, by a general interpolation process, a pixel value corresponding to the coordinates (X1,Y1) in the planes to be corrected, and determines it as the pixel value of the pixel (X,Y). These operations are performed for all pixels to perform their color shift correction.

(Color Shift Amount Obtaining Process)

Details of the color shift amount obtaining process in step S102 will be described next with reference to a flowchart shown in FIG. 5.

Although FIG. 5 shows a process of obtaining the amount of color shift between the G plane and the B plane, the amount of color shift between the G plane and the R plane can be similarly obtained. Hence, to obtain the amount of color shift between the G plane and the R plane, the "B plane" is replaced with the "R plane" in the following description.

Figure 6:
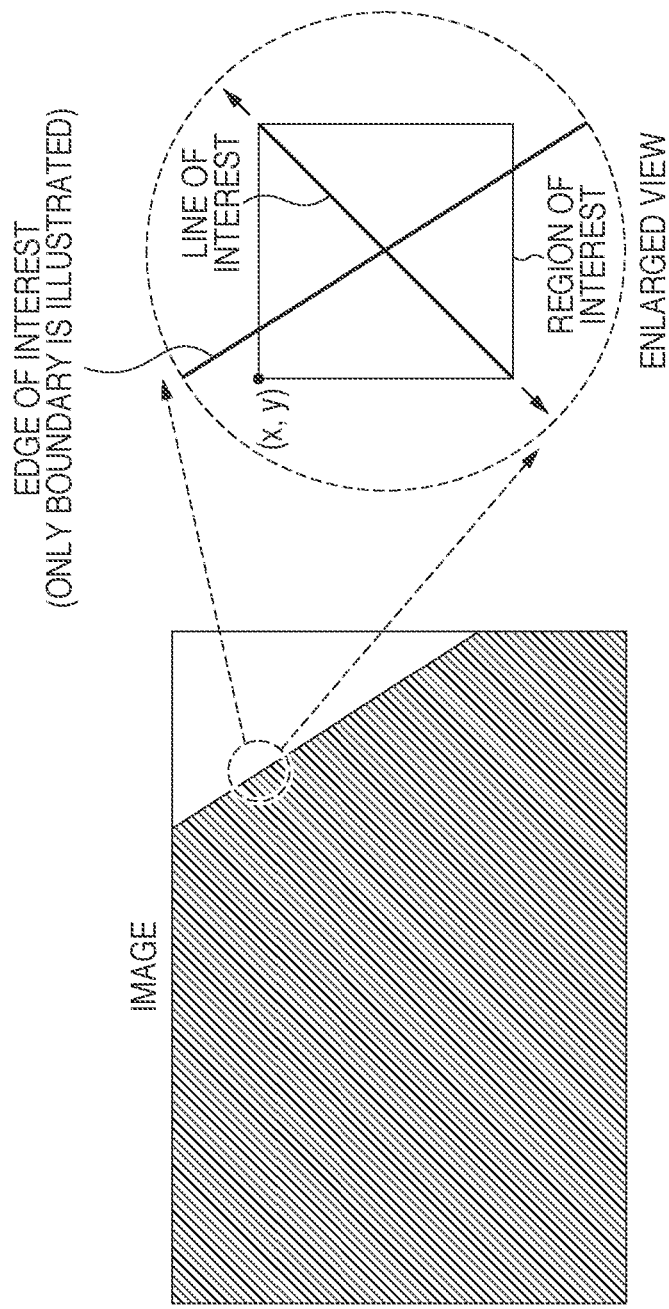
FIG. 6 is a view showing an example of an edge of interest, a region of interest, and a line of interest in the embodiment of the present invention.

Obtaining of the absolute difference sum before correction in step S201 will be described first. Upon setting a rectangular region including the edge portion of interest, where the amount of color shift is to be obtained, as a region where the absolute difference sum is to be obtained (to be referred to as the region of interest hereinafter), as shown in FIG. 6, the size of the region of interest can be set based on the width of the edge of interest and the amount of change in luminance. The width of the edge means the number of continuous pixels whose values monotonically increase or decrease in the Y plane where edge detection is to be performed. A satisfactory effect can be obtained upon setting, for example, a square region with a side length about three to five times the edge width as the region of interest.

The correction data generation unit 60 obtains an absolute difference sum S0 for pixels Gi and Bi (i=1 to n) in the regions of interest in the G and B planes, respectively, using:

$$S0 = |G1-B1| + |G2-B2| + \ldots + |Gn-Bn|$$

Color difference obtaining before correction in step S202 will be described next.

One line (m pixels) which passes through the center of the region of interest and runs in the direction to obtain the amount of color shift (to be referred to as the line of interest hereinafter) is set as a region where the color difference is to be calculated (color difference obtaining region), as shown in FIG. 6. In this example, since the region of interest is at the upper right in the image, the amount of color shift is obtained in the oblique upper right/oblique lower left direction. That is, the orientation of the line of interest is determined based on where the edge is located in the image.

The color difference calculation unit 61 calculates a color difference C0 for each pair of pixels Gj and Bj (j=0 to m$^{-1}$) within the lines of interest in the G and B planes, respectively, using:

$$C0[j] = Bj - Gj$$

to obtain a color difference array C0[m] consists of the calculated color differences between each pair of pixels.

More accurate color difference evaluation can be performed by correcting the pixel values within each line of interest in obtaining the color differences. For example, the pixel values on the line of interest in the B plane can be corrected such that the maximum pixel value on the line of interest in the G plane becomes equal to that on the line of interest in the B plane. In this case, the color difference calculation unit 61 can obtain a color difference array C0[m] as:

Gmax: Maximum Pixel Value on Line of Interest in G Plane

Bmax: Maximum Pixel Value on Line of Interest in B Plane $$Gj' = Gmax/Bmax \times Gj$$

$$C0[j] = Bj - Gj'$$

In step S203, the correction data generation unit 60 moves the region of interest in the B plane (or the whole B plane) by one pixel toward the optical center in the direction to detect the amount of color shift. In the example shown in FIG. 6, letting (x,y) be the coordinates of a pixel B1 on the upper left corner of the region of interest in the B plane, the coordinates of the pixel on the upper left corner of the region of interest after the movement are (x−1,y−1). That is, when the region of interest in the B plane (or the whole B plane) moves by one pixel toward the optical center in the direction, the position of the pixel B1 also moves from (x,y) to (x−1,y−1). Accordingly, the correction data generation unit 60 obtains an absolute difference sum S0 by summing an absolute difference between the pixel G1 at (x,y) in the G plane and the pixel B1 at (x−1,y−1), an absolute difference between the pixel G2 at (x+1,y) in the G plane and the pixel B2 at (x,y−1), . . . , and absolute difference between the pixel Gn at (x+p,y+q) in the G plane and the pixel Bn at (x+p−1,y+q−1).

In step S204, the color difference calculation unit 61 calculates a color difference C[j] for each pair of pixels on the line of interest in the G plane and the line of interest in the region of interest in the moved B plane to obtain a color difference array C[m] consists of the calculated color differences between each pair of pixels, as in step S202. Note that the line of interest is also moved as the plane to which the line of interest belongs is moved.

In step S205, the correction data generation unit 60 evaluates the obtained color differences.

Figure 7A:
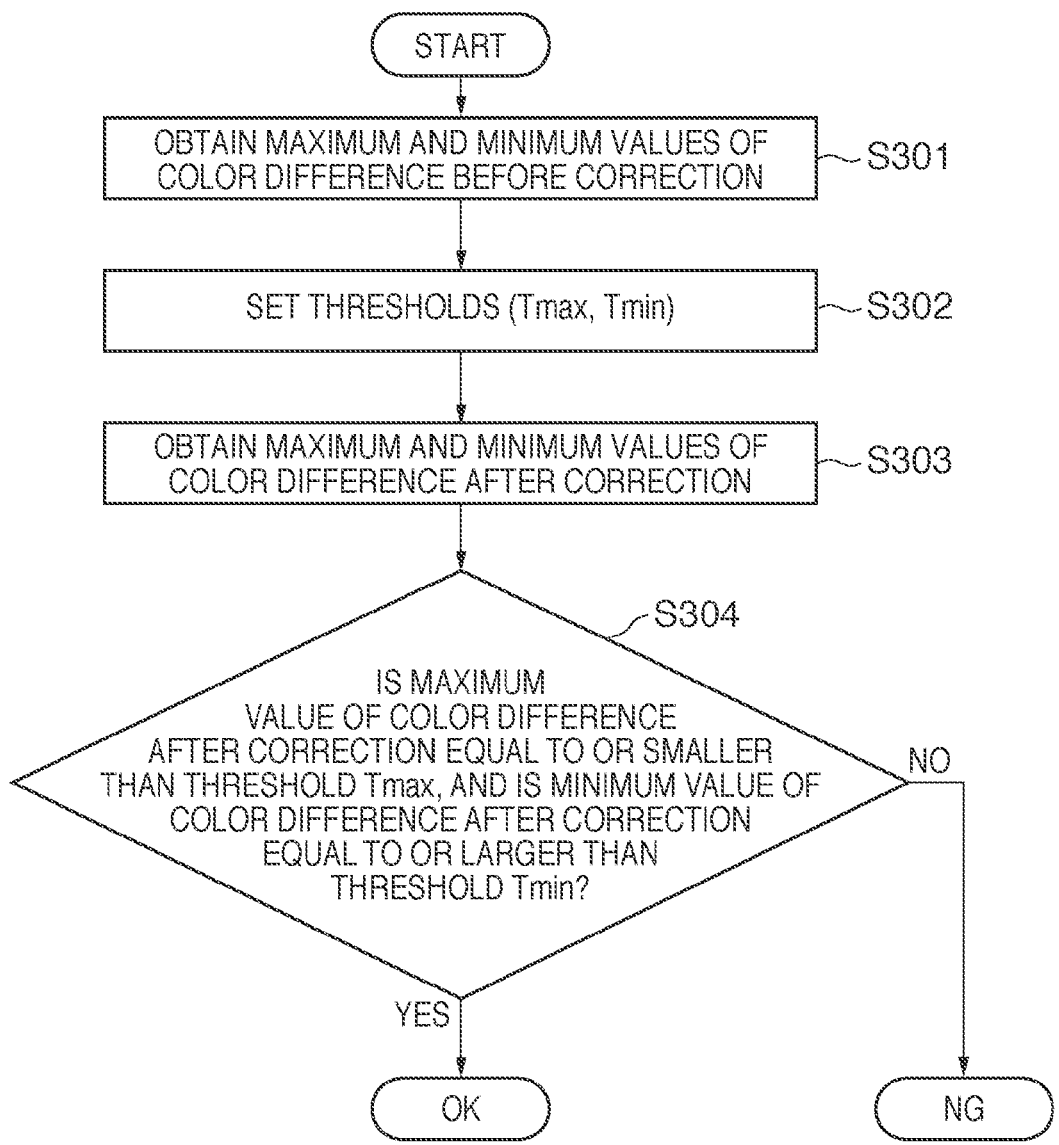
FIGS. 7A and 7B are flowcharts for explaining one example and another example of details of color difference evaluation processes in steps S205 and S211 of FIG. 5.

FIG. 7A is a flowchart showing details of the color difference evaluation process in step S205.

The correction data generation unit 60 obtains maximum and minimum values from the color difference array C0[m] before correction, which is obtained in step S202 (S301). The correction data generation unit 60 then uses a constant K to define thresholds Tmax and Tmin (S302) as:

C0max: Maximum Value of Color Difference Array C0[m] before Correction, Which Is Obtained in Step S202

C0min: Minimum Value of Color Difference Array C0[m] before Correction, Which Is Obtained in Step S202

$$T\max = C0\max + K$$

$$T\min = C0\min - K$$

Although the constant K greatly differs depending on, for example, whether the image data is raw data or JPEG data, it is desirably decided based on the number of gray levels of pixels in both cases. For example, the constant K may be about 100 to 150 for raw data with 16,383 gray levels. The constant K may be about 15 to 20 for a JPEG image with 255 gray levels.

The correction data generation unit 60 obtains maximum and minimum values from a color difference array C[m] obtained in step S204 (S303), and determines whether the color difference is OK or NG by the following process using the thresholds Tmax and Tmin defined in step S302 (S304).

More specifically, letting Cmax be the maximum value of the color difference array C[m] obtained in step S204, and Cmin be the minimum value of the color difference array C[m] obtained in step S204, it is determined in step S304 that the color difference is OK if the maximum value Cmax is equal to or smaller than the threshold Tmax and the minimum value Cmin is equal to or larger than the threshold Tmin; or that the color difference is NG otherwise.

Figures 8A, 8B:
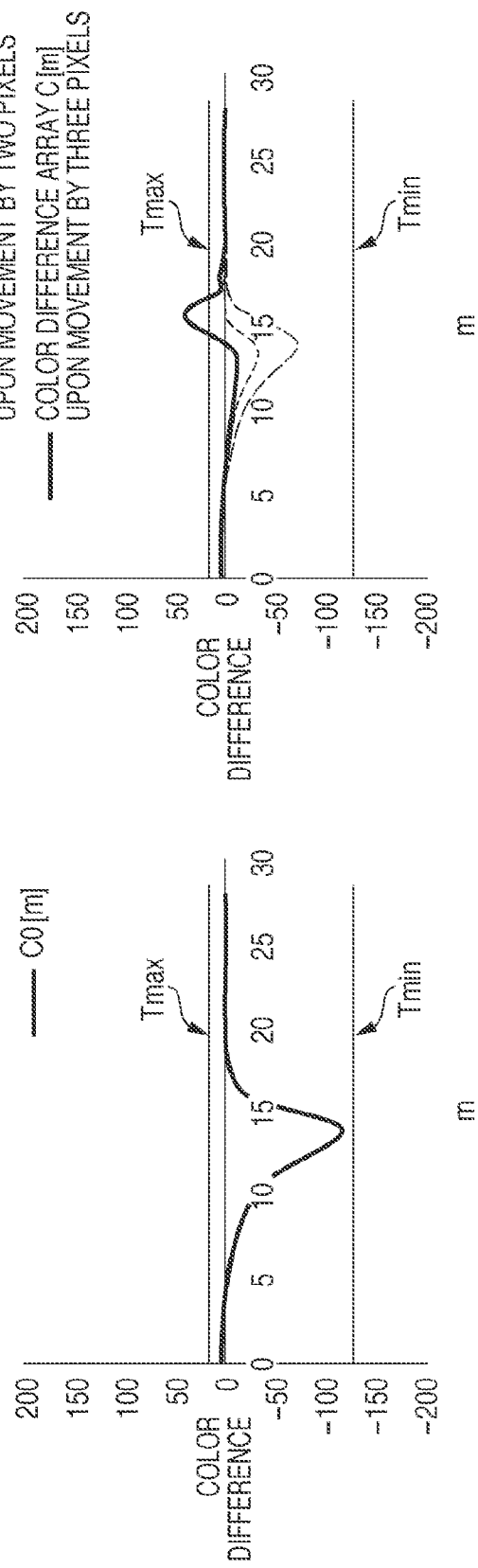
FIGS. 8A and 8B are graphs showing examples of the color difference in correction.
Figure 9A:
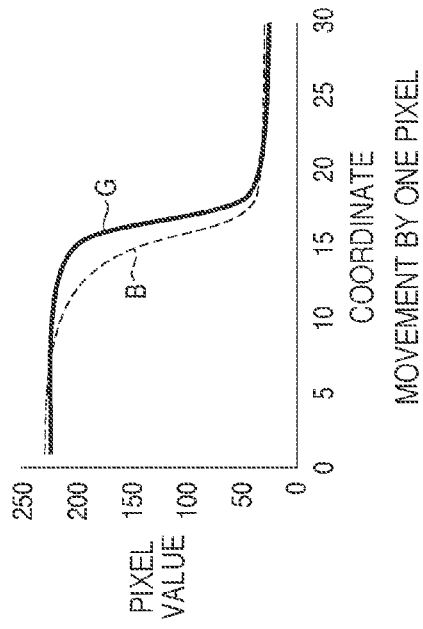
FIGS. 9A to 9D are graphs showing examples of a color shift in correction.
Figure 9B:
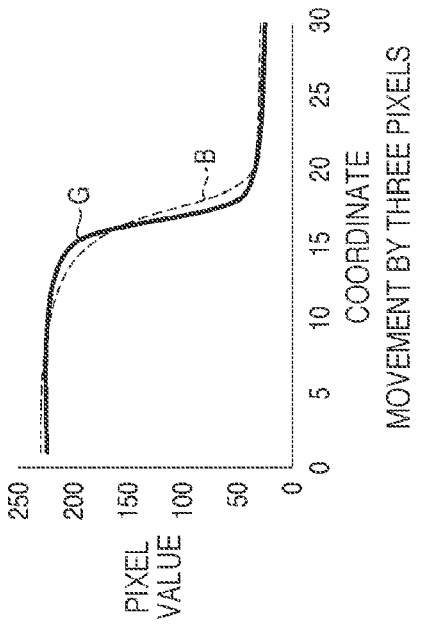
Figure 9C:
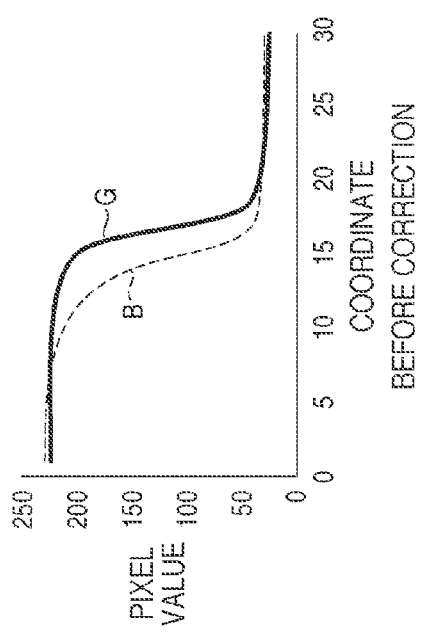
Figure 9D:
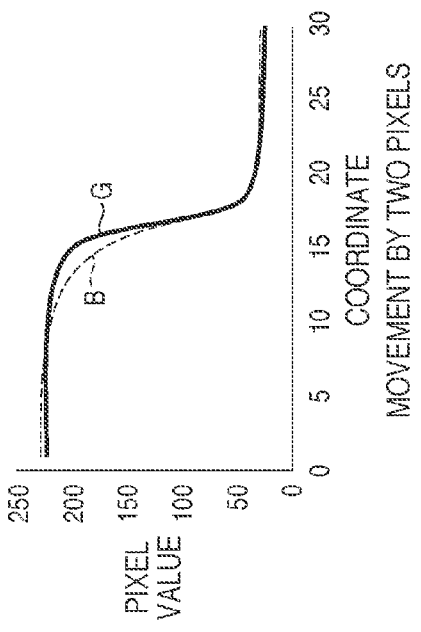

FIGS. 8A and 8B show the relationships between the thresholds Tmax and Tmin and the color difference arrays C0[m] and C[m]. FIG. 8A shows the relationships between the set thresholds Tmax and Tmin and the color difference array C0[m] before correction. FIG. 8B shows the relationships between the thresholds Tmax and Tmin and the color difference array C[m] when the region of interest in the B plane has moved by one to three pixels. In this example, OK is determined if the region of interest has moved by one or two pixels, but NG is determined if it has moved by three pixels.

FIGS. 9A to 9D show the state of the edge before correction and those of the edge having undergone color shifts when the region of interest has moved by one to three pixels, respectively, in correspondence with FIGS. 8A and 8B. Upon the movement of the region of interest by three pixels, for which NG is determined, overcorrection of the B plane occurs, so the color of the edge changes from yellow before correction to blue after correction, as can be seen from FIG. 9D.

Referring back to FIG. 5, step S206 is executed only when OK is determined upon the color difference evaluation in step S205. The correction data generation unit 60 obtains an absolute difference sum S[j], as in step S201, in the region of interest in the G plane and the region of interest in the moved B plane.

In step S207, the correction data generation unit 60 determines whether the region of interest has moved by a preset maximum distance. If the region of interest has not yet moved by the maximum distance, the process returns to step S203. The maximum distance of the region of interest must be larger than the amount of color shift. Nevertheless, an excessively large maximum distance lowers the process efficiency. The inventor of the present invention empirically concluded that a distance equal to the side length (that is, about three to five times the edge width) of the region of interest suffices as the maximum distance.

If it is determined in step S205 that the color difference is NG, or it is determined in step S207 that the region of interest has moved by the maximum distance, the correction data generation unit 60 resets the region of interest in step S208. In this process, the region of interest in the B plane is returned to the position before correction, after color difference evaluation and absolute difference sum obtaining are performed while the region of interest in the B plane is sequentially moved toward the optical center in steps S203 to S207.

In processes of steps S209 to S213, color difference evaluation and absolute difference sum obtaining are performed while the region of interest in the B plane is sequentially moved in a direction opposite to the optical center from the position before correction. Except for the moving direction of the region of interest, the processes in steps S209 to S213 are the same as in steps S203 to S207, respectively, and a description thereof will not be given.

In step S214, the correction data generation unit 60 detects a minimum value from the previously obtained absolute difference sums, and decides the distance of the region of interest for the minimum absolute difference sum as the amount of color shift. At this time, if the R plane (or the B plane) shifts toward the optical center with respect to the G plane, the amount of color shift is assumed as negative. In contrast, if the R plane (or the B plane) shifts in a direction opposite to the optical center with respect to the G plane, the amount of color shift is assumed as positive.

In this manner, in this embodiment, the amount of color shift is not decided only by determination of the degree of similarity between pixel values based on the absolute difference sum, but is decided in the range in which overcorrection does not occur by determining, based on the amount of change in color difference, whether a change in color on the edge portion is expected to occur upon overcorrection. This makes it possible to obtain an appropriate amount of color shift which does not make the observer feel unnatural when he or she compares the edge portion before correction with that after correction.

Although the accuracy of obtaining the amount of color shift is one pixel in this embodiment, in step S214 the amount of color shift may be obtained with an accuracy less than one pixel by interpolating the obtained absolute difference sums in determining a minimum absolute difference sum. Alternatively, in steps S203 and S209, the amount of color shift may be obtained with an accuracy less than one pixel by shifting the region of interest in steps of a unit less than one pixel by interpolating the pixels in the region of interest.

Furthermore, although color difference obtaining in steps S202 and S210 and color difference evaluation in steps S205 and S211 are performed for one-dimensional lines of interest in this embodiment, they may be performed for two-dimensional regions of interest as used for absolute difference sum obtaining. In this case as well, color difference evaluation in steps S205 and S211 can be implemented without requiring any changes except that in the latter regions of interest minimum and maximum values are detected within a two-dimensional range.

Second Embodiment

The second embodiment of the present invention will be described next. The second embodiment is the same as the first embodiment except for a color difference evaluation method to be implemented in steps S205 and S111, and only the color difference evaluation method will be described.

Figure 7B:
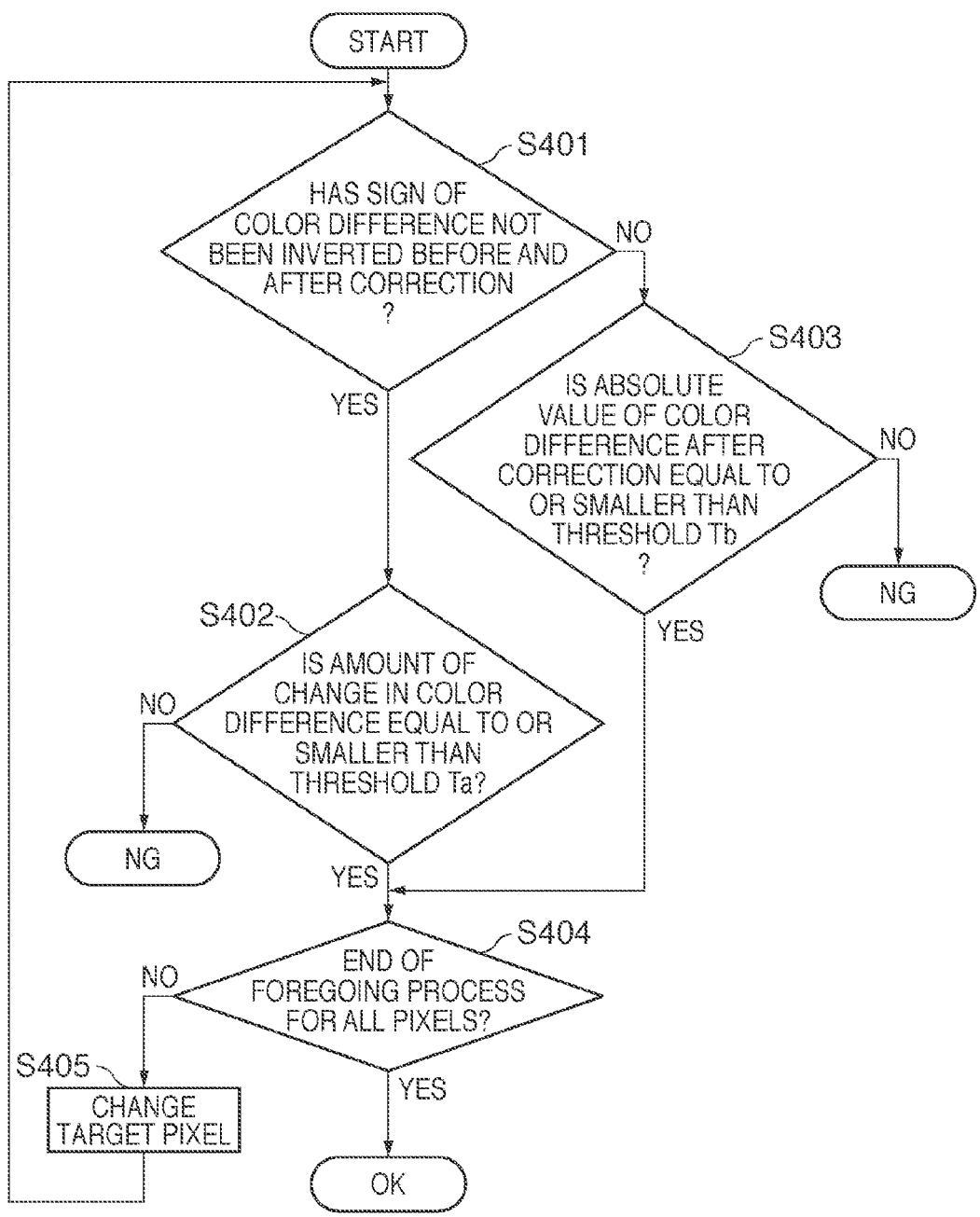

FIG. 7B is a flowchart for explaining details of color difference evaluation to be implemented in steps S205 and S211 in the second embodiment.

In color difference evaluation of the second embodiment, a correction data generation unit 60 performs the procedure of:

determining whether the sign of the color difference has not inverted before and after correction (S401) (so determining whether correction has resulted in the sign of the color difference being inverted after correction with respect to the sign before correction), and determining that a pixel with an amount of change in color difference, that exceeds color difference evaluation threshold 1 (Ta), is NG if the sign of the color difference has not inverted before and after correction (so correction has not resulted in inversion) (S402), or determining that a pixel with an absolute color difference after correction, that exceeds color difference evaluation threshold 2 (Tb), is NG if the sign of the color difference has inverted before and after correction (so correction has resulted in inversion) (S403), for all values of j (0 to m−1) in the color differences C0[j] and C[j] (S404 and S405) to determine whether there is a pixel determined as NG. The correction data generation unit 60 determines that the color difference is OK if none of pixels with any values j are determined as NG (S404 and S405).

Although the color difference evaluation thresholds Ta and Tb greatly differ depending on, for example, whether the image data is raw data or JPEG data, they are desirably decided based on the number of gray levels of pixels in both cases. For example, both the color difference evaluation thresholds Ta and Tb may be about 100 to 150 for raw data with 16,383 gray levels. Both the color difference evaluation thresholds Ta and Tb may be about 15 to 20 for a JPEG image with 255 gray levels.

According to this embodiment, color difference evaluation is performed for each pixel. Hence, in addition to the effect of the first embodiment, correction which generates a pair of pixels with a color difference between them, that changes considerably, can be suppressed even if the maximum or minimum value of the color difference changes little on the lines of interest.

Third Embodiment

The third embodiment of the present invention will be described next. The third embodiment is the same as the first and second embodiments except for a color difference evaluation method to be implemented in steps S205 and S211, and only the color difference evaluation method will be described.

Figure 10:
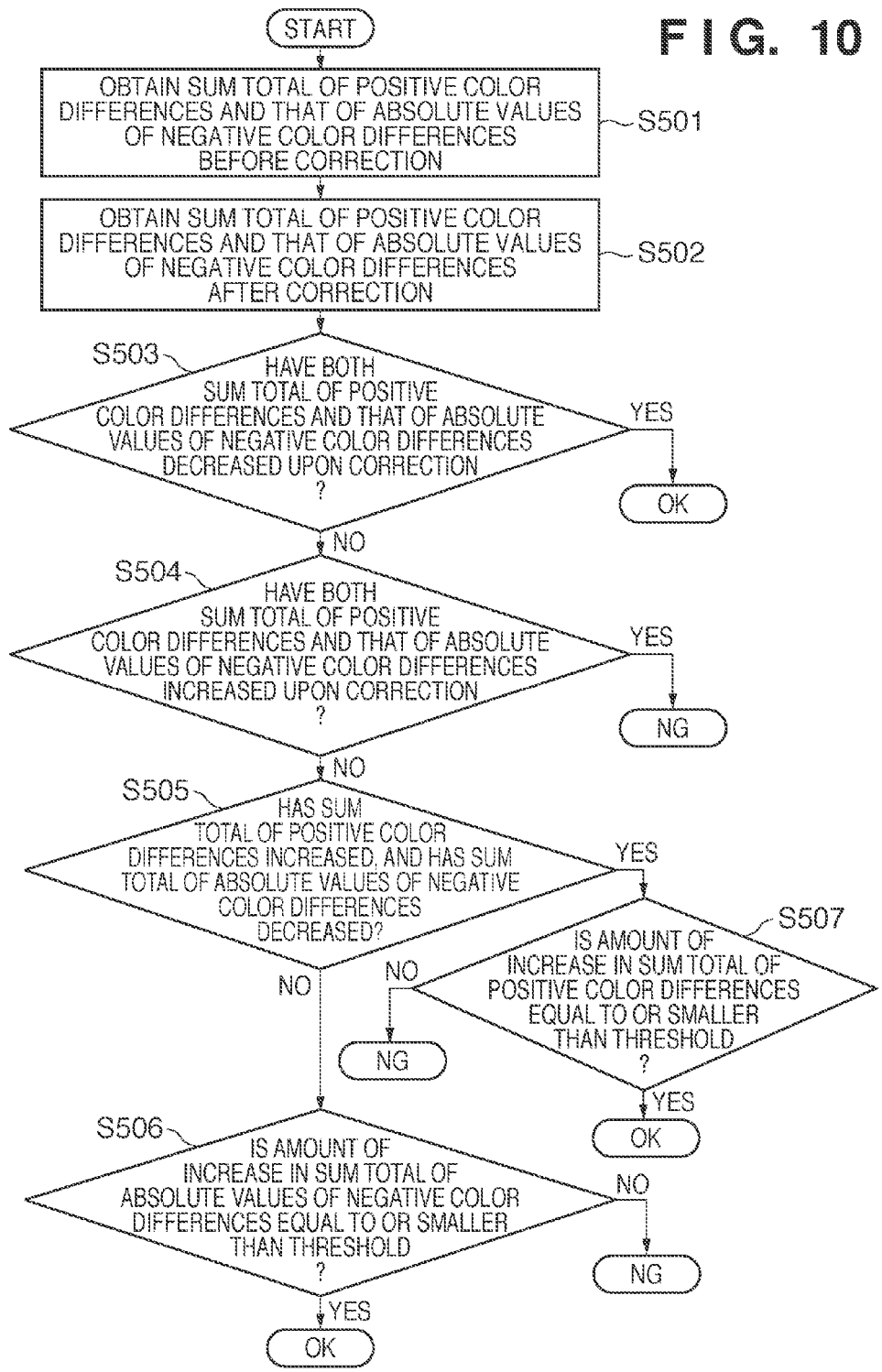
FIG. 10 is a flowchart for explaining still another example of details of the color difference evaluation processes in steps S205 and S211 of FIG. 5.

FIG. 10 is a flowchart for explaining details of color difference evaluation to be implemented in steps S205 and S211 in the third embodiment.

First, a correction data generation unit 60 uses a color difference calculation unit 61 to calculate the sum total of the positive values of color differences in the color difference array C0[m] before correction and that of the absolute values of the negative values of color differences in the color difference array C0[m] (S501), and to calculate the sum total of the positive values of color differences in the color difference array C[m] after correction and that of the absolute values of the negative values of color differences in the color difference array C[m] (S502).

The correction data generation unit 60 determines whether the color difference is OK or NG by:

determining OK if both the sum totals of the positive values and the absolute values of the negative values have decreased after correction compared to those before correction (S503), determining NG if both the sum totals of the positive values and the absolute values of the negative values have increased after correction compared to those before correction (S504), and if the sum total of the positive values has increased and that of the absolute values of the negative values has decreased after correction, determining OK if the amount of increase in sum total of the positive values is equal to or smaller than a threshold T; or determining NG if this amount exceeds the threshold T (S505 and S507), or if the sum total of the positive values has not increased and that of the absolute values of the negative values has increased after correction, determining OK if the amount of increase in sum total of the absolute values of the negative values is equal to or smaller than the threshold T; or determining NG if this amount exceeds the threshold T (S505 and S506).

Although the color difference evaluation threshold T greatly differs depending on, for example, whether the image data is raw data or JPEG data, it is desirably decided based on the number of gray levels of pixels and the size of the region of interest in both cases.

According to this embodiment, the color difference is evaluated based on an increase/decrease in sum total of the positive values of the color difference before and after correction and in sum total of the absolute values of the negative values of this color difference. Thus, this evaluation is based on the overall change in color difference over the entire regions of interest before and after correction. In this embodiment as well, since correction which considerably changes the color difference before and after correction can be suppressed, overcorrection, in turn, can be suppressed.

Other Embodiments

The color difference evaluation methods described in the first to third embodiments are not exclusive, and may be used in combination. One of these determination methods may be dynamically selected in accordance with, for example, image features.

Moreover, in the above-mentioned embodiment, the present invention is applied to an image capturing apparatus which includes an optical system and image sensor and exemplifies an image processing apparatus. However, an optical system and image sensor are not indispensable in the present invention. The amount of color shift can be obtained from arbitrary image data which has a plurality of color planes and is captured using an image sensing lens, and the image data format and the data obtaining method are not limited to specific ones. Also, at least some of the A/D conversion unit 30, color separation unit 40, edge extraction unit 50, correction data generation unit 60, and correction unit 70 shown in FIG. 2 may be implemented by means of software using a computer serving as a control unit (not shown) of the image capturing apparatus 100.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

A further embodiment of the invention provides an image processing apparatus arranged to correct a color shift in a captured image, wherein the captured image includes a plurality of color planes, the image processing apparatus comprising:

obtaining unit configured to obtain an amount of color shift of a second color plane with respect to a first color plane, from an edge portion of the captured image; and correction unit configured to correct a pixel value of the second color plane using correction data generated from the amount of color shift obtained by the obtaining unit, wherein the obtaining unit is arranged to:

(i) obtain the sum of the absolute values of color differences between each pixel making up a region of interest of the first color plane, including the edge portion, and the corresponding pixel of the same region of interest of the second plane;

(ii) obtain the color difference between each pixel making up a color difference obtaining region within the region of interest of the first color plane and the corresponding pixel of the same color difference obtaining region within the region of interest of the second color plane;

(iii) move the region of interest of the second color plane a predetermined distance with respect to the first color plane;

(iv) obtain the color difference between each pixel making up the color difference obtaining region within the region of interest of the first color plane and the corresponding pixel of the color difference obtaining region within the moved region of interest of the second color plane;

(v) obtain the sum of the absolute values of color differences between each pixel making up the region of interest of the first color plane and the corresponding pixel of the moved region of interest of the second color plane;

(vi) repeat iii-v at least once;

(vii) determine the distance moved by the second color plane with respect to the first plane when the difference between the color difference obtained in ii and iv falls within a predetermined range and the sum obtained in v is minimised; and (viii) obtain the distance determined in vii as the amount of color shift.

An embodiment of the invention also provides a control method for an image processing apparatus arranged to correct a color shift in a captured image including a plurality of color planes, the method comprising the steps of:

(i) obtaining the sum of the absolute values of color differences between each pixel making up a region of interest of the first color plane, including the edge portion, and the corresponding pixel of the corresponding region of interest of the second plane;

(ii) obtaining the color difference between each pixel making up a color difference obtaining region within the region of interest of the first color plane and the corresponding pixel of the corresponding color difference obtaining region within the region of interest of the second color plane;

(iii) moving the region of interest of the second color plane a predetermined distance with respect to the first color plane;

(iv) obtaining the color difference between each pixel making up the color difference obtaining region within the region of interest of the first color plane and the corresponding pixel of the color difference obtaining region within the moved region of interest of the second color plane;

(v) obtaining the sum of the absolute values of color differences between each pixel making up the region of interest of the first color plane and the corresponding pixel of the moved region of interest of the second plane;

(vi) repeating iii-v;

(vii) determining the distance moved by the second color plane with respect to the first plane when the difference between the color difference obtained in ii and iv falls within a predetermined range and the sum obtained in v is minimised;

(viii) obtaining the distance determined in vii as the amount of color shift; and (ix) correcting a pixel value of the second color plane using correction data generated from the amount of color shift obtained in viii.

Another embodiment of the invention provides an image processing apparatus that corrects a color shift in a captured image including a plurality of color planes, comprising:

obtaining unit configured to obtain an amount of color shift of a second color plane with respect to a first color plane on an edge portion of an image included in the captured image; and correction unit configured to correct a pixel value of the second color plane using correction data generated from the amount of color shift, wherein said obtaining unit includes color difference calculation unit configured to calculate a color difference between the first color plane and the second color plane for each pair of pixels in regions of interest including the edge portion, at each of a plurality of positions to which the second color plane is moved relative to the first color plane, and obtains, as the amount of color shift of the second color plane with respect to the first color plane, a distance of the second color plane, at which a magnitude of change between (i) a color difference calculated by said color difference calculation unit without moving the second color plane and (ii) a color difference calculated by said color difference calculation unit upon moving the second color plane falls within a predetermined range, and a sum of absolute values of color differences between pixels in the regions of interest minimizes.

A still further embodiment of the invention provides a control method for an image processing apparatus which corrects a color shift in a captured image including a plurality of color planes, comprising:

an obtaining step of obtaining an amount of color shift of a second color plane with respect to a first color plane on an edge portion of an image included in the captured image; and a correction step of correcting a pixel value of the second color plane using correction data generated from the amount of color shift, wherein the obtaining step includes a color difference calculation step of calculating a color difference between the first color plane and the second color plane for each pair of pixels in regions of interest including the edge portion, at each of a plurality of positions to which the second color plane is moved relative to the first color plane, and in the obtaining step, a distance of the second color plane, at which a magnitude of change between a color difference calculated in the color difference calculation step without moving the second color plane and a color difference calculated in the color difference calculation step upon moving the second color plane falls within a predetermined range, and a sum of absolute values of color differences between pixels in the regions of interest minimizes, is obtained as the amount of color shift of the second color plane with respect to the first color plane (S214).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-253523, filed on Nov. 4, 2009, which is hereby incorporated by reference herein in its entirety.

What is claimed is:

1. An image processing apparatus that corrects a color shift in a captured image including a plurality of color planes, comprising:
an obtaining unit configured to obtain an amount of color shift of a second color plane with respect to a first color plane on an edge portion of an image included in the captured image; and
a correction unit configured to correct a pixel value of the second color plane using correction data generated from the amount of color shift,
wherein said obtaining unit
includes a color difference calculation unit configured to calculate a color difference between the first color plane and the second color plane for a plurality of pairs of pixels in regions of interest including the edge portion, at each of a plurality of positions to which the region of interest of the second color plane is moved relative to the first color plane, and
obtains, as the amount of color shift of the second color plane with respect to the first color plane, from among distances at which a magnitude of change between (i) a color difference calculated by said color difference calculation unit without moving the region of interest of the second color plane and (ii) a color difference calculated by said color difference calculation unit upon moving the region of interest of the second color plane falls within a predetermined range, a distance of the second color plane at which a sum of absolute values of color differences between pixels in the regions of interest is minimized.

2. The apparatus according to claim 1, wherein the obtaining unit is configured to calculate the sum of the absolute values of color differences between each pair of pixels in the regions of interest of the first plane and the second plane.

3. The apparatus according to claim 2, wherein the color difference calculation unit is configured to calculate the color difference between each pair of pixels in a color difference obtaining region within the regions of interest.

4. The apparatus according to claim 3, wherein the color difference obtaining region is a line.

5. The apparatus according to claim 3, wherein the color difference calculation unit is configured to calculate the color difference between each pair of pixels, in the color difference obtaining region of the region of interest of the first color plane and the second color plane, wherein the region of interest in the first and second color planes correspond and further arranged to calculate the color difference between each pair of pixels, in the color difference obtaining region of the region of interest of the first color plane and the color difference obtaining region of the region of interest of the second color plane, wherein the region of interest of the second plane is moved relative to the first plane.

6. The apparatus according to claim 1, wherein the region of interest of the second plane is moved towards and/or away from the optical center of the captured image.

7. The apparatus according to claim 1, wherein the pairs of pixels have the same position within their respective region of interest.

8. The apparatus according to claim 1, wherein the distance of the second plane corresponds to the distance the region of interest of the second plane is moved with respect to the first plane when the magnitude of change between (i) a color difference calculated by said color difference calculation unit without moving the second color plane and (ii) a color difference calculated by said color difference calculation unit upon moving the second color plane falls within a predetermined range, and a sum of absolute values of color differences between pixels in the regions of interest minimizes.

9. The apparatus according to claim 1, wherein each color plane making up the captured image corresponds to pixel values of a particular color component of the captured image.

10. The apparatus according to according to claim 1, wherein said obtaining unit determines that the magnitude of change between (i) the color difference calculated by said color difference calculation unit without moving the region of interest of the second color plane (ii) and the color difference calculated by said color difference calculation unit upon moving the region of interest of the second color plane falls within the predetermined range if an increase in maximum value of a color difference in the regions of interest calculated by said color difference calculation unit upon moving the region of interest of the second color plane with respect to a maximum value of a color difference in the regions of interest calculated by said color difference calculation unit without moving the region of interest of the second color plane is not more than a predetermined threshold, and a decrease in minimum value of the color difference in the regions of interest calculated by said color difference calculation unit upon moving the region of interest of the second color plane with respect to a minimum value of the color difference in the regions of interest calculated by said color difference calculation unit without moving the region of interest of the second color plane is not more than the threshold.

11. The apparatus according to claim 1, wherein
said obtaining unit determines that the magnitude of change between (i) the color difference calculated by said color difference calculation unit without moving the region of interest of the second color plane and (ii) the color difference calculated by said color difference calculation unit upon moving the region of interest of the second color plane falls within the predetermined range if the color difference between each pair of pixels calculated in the regions of interest satisfies one of conditions:

(1) a color difference in the regions of interest calculated by said color difference calculation unit without moving the region of interest of the second color plane, and a color difference in the regions of interest calculated by said color difference calculation unit upon moving the region of interest of the second color plane have identical signs, and an amount of change in color difference is not more than a predetermined threshold, and (2) the color difference in the regions of interest calculated by said color difference calculation unit without moving the region of interest of the second color plane, and the color difference in the regions of interest calculated by said color difference calculation unit upon moving the region of interest of the second color plane have opposite signs, and an absolute value of the color difference in the regions of interest calculated upon moving the region of interest of the second color plane is not more than a predetermined threshold.

12. The apparatus according to claim 1, wherein
said color difference calculation unit calculates a sum total of positive color differences and a sum total of absolute values of negative color differences in the regions of interest, both of which are calculated by said color difference calculation unit without moving the region of interest of the second color plane, and a sum total of positive color differences and a sum total of absolute values of negative color differences in the color difference obtaining regions, both of which are calculated by said color difference calculation unit upon moving the region of interest of the second color plane, and said obtaining unit determines that the magnitude of change between the color difference calculated by said color difference calculation unit without moving the region of interest of the second color plane, and the color difference calculated by said color difference calculation unit upon moving the region of interest of the second color plane falls within the predetermined range if one of conditions:

(1) both the sum total of the positive color differences and the sum total of the absolute values of the negative color differences in the regions of interest calculated upon moving the region of interest of the second color plane have decreased with respect to the sum total of the positive color differences and the sum total of the absolute values of the negative color differences, respectively, in the regions of interest calculated by said color difference calculation unit without moving the region of interest of the second color plane, (2) the sum total of the positive color differences in the regions of interest calculated by said color difference calculation unit upon moving the region of interest of the second color plane has increased with respect to the sum total of the positive color differences in the regions of interest calculated by said color difference calculation unit without moving the region of interest of the second color plane, and the sum total of the absolute values of the negative color differences in the regions of interest calculated by said color difference calculation unit upon moving the region of interest of the second color plane has decreased with respect to the sum total of the absolute values of the negative color differences in the regions of interest calculated by said color difference calculation unit without moving the region of interest of the second color plane, and an amount of increase in sum total of the positive color differences is not more than a predetermined threshold, and (3) the sum total of the positive color differences in the regions of interest calculated by said color difference calculation unit upon moving the region of interest of the second color plane has decreased with respect to the sum total of the positive color differences in the regions of interest calculated by said color difference calculation unit without moving the region of interest of the second color plane, the sum total of the absolute values of the negative color differences in the regions of interest calculated by said color difference calculation unit upon moving the region of interest of the second color plane has increased with respect to the sum total of the absolute values of the negative color differences in the regions of interest calculated by said color difference calculation unit without moving the region of interest of the second color plane, and an amount of increase in sum total of the absolute values of the negative color differences is not more than a predetermined threshold is satisfied.

13. A control method for an image processing apparatus which corrects a color shift in a captured image including a plurality of color planes, comprising:

an obtaining step of obtaining an amount of color shift of a second color plane with respect to a first color plane on an edge portion of an image included in the captured image; and a correction step of correcting a pixel value of the second color plane using correction data generated from the amount of color shift, wherein the obtaining step includes a color difference calculation step of calculating a color difference between the first color plane and the second color plane for a plurality of pairs of pixels in regions of interest including the edge portion, at each of a plurality of positions to which the region of interest of the second color plane is moved relative to the first color plane, and in the obtaining step, from among distances at which a magnitude of change between a color difference calculated in the color difference calculation step without moving the region of interest of the second color plane and a color difference calculated in the color difference calculation step upon moving the region of interest of the second color plane falls within a predetermined range, a distance of the second color plane at which a sum of absolute values of color differences between pixels in the regions of interest is minimized, is obtained as the amount of color shift of the second color plane with respect to the first color plane.

14. A computer-readable non-transitory recording medium recording a program for causing a computer to function as each unit of an image processing apparatus defined in claim 1.

15. A computer-readable non-transitory recording medium recording a program which causes a programmable image processing apparatus to correct a color shift in a captured image including a plurality of color planes, the program comprising:

a code portion which carries out an obtaining step of obtaining an amount of color shift of a second color plane with respect to a first color plane on an edge portion of an image included in the captured image; and a code portion which carries out a correction step of correcting a pixel value of the second color plane using correction data generated from the amount of color shift, wherein the obtaining step includes a color difference calculation step of calculating a color difference between the first color plane and the second color plane for a plurality of pairs of pixels in regions of interest including the edge portion, at each of a plurality of positions to which the region of interest of the second color plane is moved relative to the first color plane, and in the obtaining step, from among distances at which a magnitude of change between a color difference calculated in the color difference calculation step without moving the region of interest of the second color plane and a color difference calculated in the color difference calculation step upon moving the region of interest of the second color plane falls within a predetermined range, a distance of the second color plane at which a sum of absolute values of color differences between pixels in the regions of interest is minimized, is obtained as the amount of color shift of the second color plane with respect to the first color plane.

\* \* \* \* \*